United States Patent
Zhang et al.

(10) Patent No.: US 12,476,322 B2
(45) Date of Patent: Nov. 18, 2025

(54) BATTERY PACK VENTING ASSEMBLY AND VENTING METHOD

(71) Applicant: Ford Global Technologies, LLC, Dearborn, MI (US)

(72) Inventors: Xiaogang Zhang, Novi, MI (US); Steven Wooldridge, Manchester, MI (US); Jianwen Yi, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 18/483,668

(22) Filed: Oct. 10, 2023

(65) Prior Publication Data

US 2025/0118856 A1    Apr. 10, 2025

(51) Int. Cl.
*H01M 50/358* (2021.01)
*B60H 1/00* (2006.01)

(52) U.S. Cl.
CPC ...... *H01M 50/358* (2021.01); *B60H 1/00278* (2013.01); *H01M 2220/20* (2013.01)

(58) Field of Classification Search
CPC ............. H01M 10/613; H01M 10/625; H01M 10/6556; H01M 50/358; H01M 2220/20; B60H 1/00278; Y02E 60/10
See application file for complete search history.

(56) References Cited

U.S. PATENT DOCUMENTS

| | | |
|---|---|---|
| 4,969,507 A | 11/1990 | Rosenbald |
| 8,557,415 B2 | 10/2013 | Herron et al. |
| 9,685,645 B2 | 6/2017 | Janarthanam et al. |
| 10,312,490 B2 | 6/2019 | Maguire |
| 11,217,857 B2 | 1/2022 | Lindstrom et al. |
| 2002/0081484 A1 | 6/2002 | Exnar |
| 2007/0193300 A1 | 8/2007 | Tilton et al. |
| 2014/0251579 A1 | 9/2014 | Sloss |
| 2016/0020448 A1 | 1/2016 | Iqbal et al. |
| 2019/0140229 A1 | 5/2019 | Lindstrom et al. |
| 2019/0260102 A1 | 8/2019 | Schmiedhofer et al. |
| 2022/0158146 A1* | 5/2022 | Janarthanam ....... H01M 50/249 |
| 2022/0399784 A1 | 12/2022 | Svrcek et al. |
| 2023/0187773 A1 | 6/2023 | Maresch et al. |
| 2023/0246289 A1* | 8/2023 | Pröll ................... H01M 50/209 429/82 |

FOREIGN PATENT DOCUMENTS

| | | |
|---|---|---|
| EP | 3443603 B1 | 2/2019 |
| WO | 2023282633 A1 | 1/2023 |
| WO | 2023078646 A1 | 5/2023 |

* cited by examiner

*Primary Examiner* — Elizabeth J Martin
*Assistant Examiner* — Adam Dorrel Moore
(74) *Attorney, Agent, or Firm* — David B. Kelley; Carlson, Gaskey & Olds, P.C.

(57) ABSTRACT

A battery pack venting assembly includes a battery pack vent that communicates a flow of vent byproducts from a battery pack. The battery pack vent has a coolant passage that communicates a coolant to manage thermal energy levels within the flow of vent byproducts. The coolant can be a liquid coolant. The battery pack vent can be configured to communicate the flow to impinge on areas of the battery pack vent.

20 Claims, 7 Drawing Sheets

BATTERY PACK VENTING ASSEMBLY AND VENTING METHOD

TECHNICAL FIELD

This disclosure relates generally to discharging vent byproducts from a traction battery pack and, more particularly, to cooling the vent byproducts prior to the discharging.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

In some aspects, the techniques described herein relate to a battery pack venting assembly, including: a battery pack vent that communicates a flow of vent byproducts from a battery pack, the battery pack vent having a coolant passage that communicates a coolant to manage thermal energy levels within the flow of vent byproducts.

In some aspects, the techniques described herein relate to a battery pack venting assembly, wherein the battery pack vent includes a first ring, and a second ring that is radially outside the first ring, the battery pack vent further including at least one support leg extending radially from the first ring to the second ring.

In some aspects, the techniques described herein relate to a battery pack venting assembly, wherein the coolant passage extends through the first ring, the second ring, and the at least one support leg.

In some aspects, the techniques described herein relate to a battery pack venting assembly, wherein the battery pack vent further includes a third ring that is radially outside the second ring, the battery pack vent further including at least one support leg extending radially from the second ring to the third ring, the coolant passage additionally extending through the third ring and the at least one support leg extending radially from the second ring to the third ring.

In some aspects, the techniques described herein relate to a battery pack venting assembly, wherein the first ring includes a plurality of first ring apertures that permit vent byproducts to flow radially from a position that is radially inside the first ring to a position that is radially outside the first ring.

In some aspects, the techniques described herein relate to a battery pack venting assembly, wherein the second ring includes a plurality of second ring apertures that permit vent byproducts to flow radially from a position that is radially inside the second ring to a position that is radially outside the second ring.

In some aspects, the techniques described herein relate to a battery pack venting assembly, wherein the plurality of first ring apertures are circumferentially offset from the plurality of second ring apertures about an axis of the battery pack vent.

In some aspects, the techniques described herein relate to a battery pack venting assembly, wherein the coolant is liquid coolant.

In some aspects, the techniques described herein relate to a battery pack venting assembly, wherein the battery pack vent is a metal or a metal alloy.

In some aspects, the techniques described herein relate to a battery pack venting assembly, wherein the battery pack vent is secured to an enclosure of the battery pack.

In some aspects, the techniques described herein relate to a battery pack venting assembly, wherein the flow of vent byproducts is discharged radially from the battery pack vent.

In some aspects, the techniques described herein relate to a method of venting from a battery pack, including: receiving a flow of vent byproducts at a battery pack vent; managing thermal energy within the flow of vent byproducts using a coolant that is communicated through the battery pack vent; and discharging the flow of vent byproducts from the battery pack vent.

In some aspects, the techniques described herein relate to a method, further including communicating the vent byproducts within the battery pack vent between a first ring and a second ring of the battery pack vent.

In some aspects, the techniques described herein relate to a method, wherein the coolant is communicated through at least one coolant passage within the first ring, within the second ring, or both.

In some aspects, the techniques described herein relate to a method, wherein the first ring and the second ring are coaxially arranged about a vent axis.

In some aspects, the techniques described herein relate to a method, further including, within the battery pack vent, directing the flow of vent byproducts radially through at least one first ring aperture in the first ring such that the flow of vent byproducts impinges on the second ring and then flows between the first ring and the second ring.

In some aspects, the techniques described herein relate to a method, further including directing the flow of vent byproducts radially through at least one second ring aperture in the second ring.

In some aspects, the techniques described herein relate to a method, wherein the coolant is a liquid coolant.

In some aspects, the techniques described herein relate to a method, further including discharging the vent byproducts radially from the battery pack vent.

In some aspects, the techniques described herein relate to a method, further including discharging the vent byproducts axially from the battery pack vent through an annular outlet.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a traction battery pack of an electrified vehicle, and in particular, to a battery pack vent that cools and then discharges vent byproducts from the traction battery pack.

Figure 1:
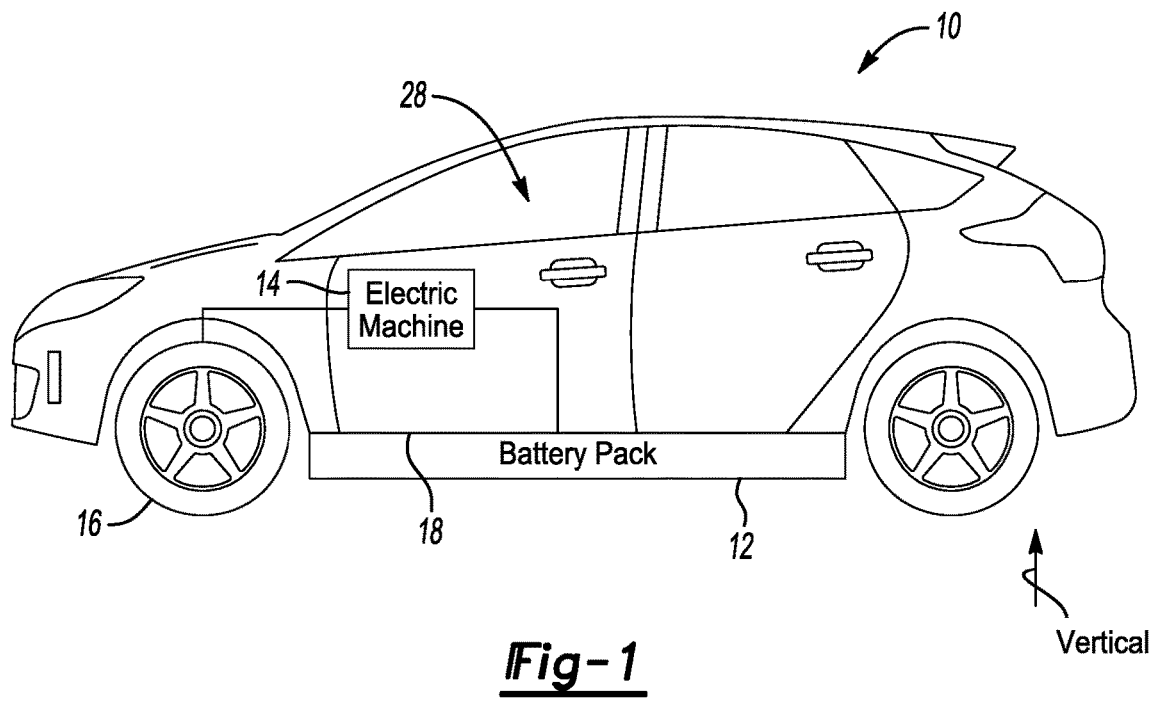
FIG. 1 illustrates a side view of an electric vehicle having a traction battery pack.

With reference to FIG. 1, an electrified vehicle 10 includes a traction battery pack 12, an electric machine 14, and wheels 16. The battery pack 12 powers an electric machine 14, which converts electric power to torque to drive the wheels 16. The battery pack 12 is a traction battery pack as the battery pack 12 is used for electric propulsion.

The battery pack 12 is, in the exemplary embodiment, secured to an underbody 18 of the electrified vehicle 10 beneath and outside a passenger compartment of the electrified vehicle 10. The battery pack 12 could be located elsewhere on the electrified vehicle 10 in other examples.

The example vehicle 10 is a battery electric vehicle (BEV). In another example, the vehicle 10 could be another type of electrified vehicle, such as a hybrid electric vehicle (HEV), plug-in hybrid electric vehicle (PHEV), or a conventional vehicle. A hybrid electric vehicle selectively drives wheels using torque provided by an internal combustion engine instead of, or in addition to, an electric machine. Generally, the electrified vehicle 10 could be any type of vehicle having a traction battery pack.

Figure 3:
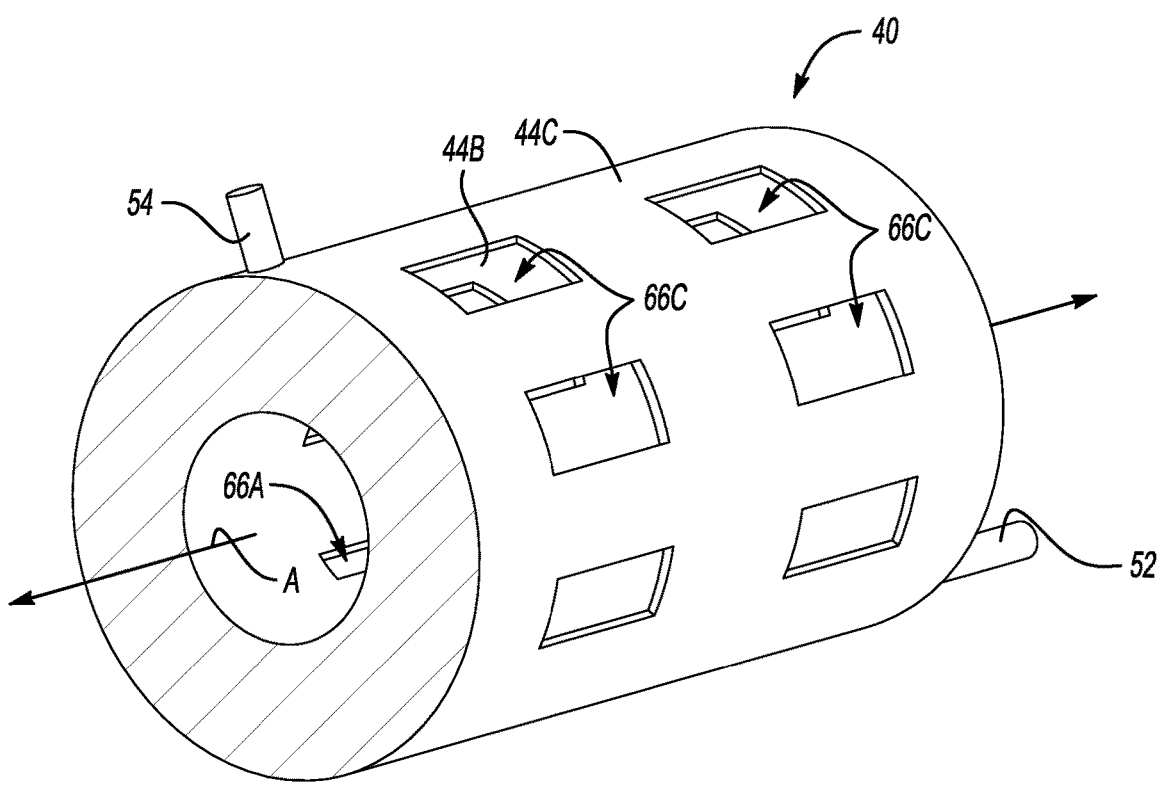
FIG. 3 illustrates a battery pack vent from the traction battery pack of FIG. 2 looking out from within an interior of the traction battery pack.
Figure 2:
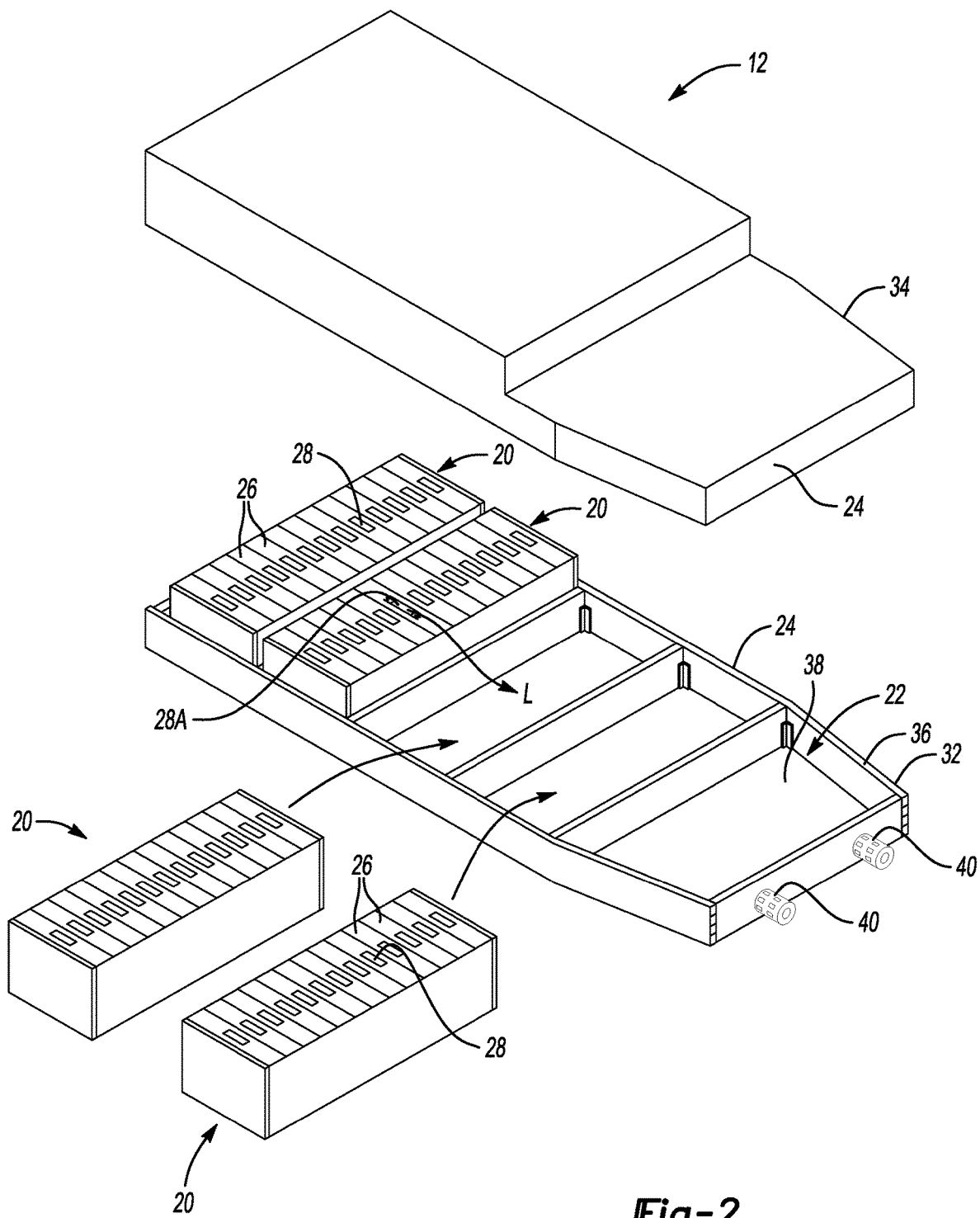
FIG. 2 illustrates a perspective expanded view of the traction battery pack from FIG. 1.

Referring now to FIGS. 2 and 3 with continuing reference to FIG. 1, the battery pack 12 includes a plurality of battery arrays 20 housed within an interior 22 of an enclosure 24. The battery arrays 20 each include groups of individual battery cells 26 arranged in a rows. In an embodiment, the battery cells 26 are lithium-ion pouch cells. However, battery cells having other geometries (cylindrical, prismatic, etc.), other chemistries (nickel-metal hydride, lead-acid, etc.), or both could alternatively be utilized within the scope of this disclosure.

From time to time, a thermal propagation event due to, for example, an overcharge or discharge, may increase pressure and temperature in one of the battery cells 26. Thermal propagation events could also be due to internal contamination, battery cell deformation, or electrical shorts. The increasing pressure and temperature can rupture a vent 28 of the battery cell 26 and release vent byproducts V from an interior of the battery cell 26 into the interior 22. Although FIG. 2 shows a single vent 28A ruptured, more than one of the battery cells 26 can vent at the same time.

Some battery cells 26, such as pouch cells, may not include a discrete vent, but could rupture in various areas due to a thermal propagation event. The rupture provides an opening that is considered a vent. Vent byproducts V discharged through an opening created by a rupture are, for purpose of this disclosure, also considered vent byproducts V.

In this example, the enclosure 24 includes a tray 32 and a cover 34. The tray 32 includes sidewalls 36 and a floor 38. When the cover 34 is secured to the tray 32, the enclosure 24 completely encloses the arrays 20.

In this example embodiment, at least one battery pack vent 40 is secured to the enclosure 24. The battery pack vent 40 can be a vent tip in some examples.

The battery pack vent 40 communicates the vent byproducts V from the interior 22 of the battery pack 12 to an ambient area that is outside the battery pack 12. For purposes of this disclosure, ambient areas are areas that are outside the battery pack 12, outside the passenger compartment of the vehicle 10, and, if so equipped, outside an engine compartment or trunk of the vehicle 10. Ambient air refers to the air within the ambient areas. A temperature of the ambient air is typically much lower than a temperature of the vent byproducts V within the interior 22.

Figure 4:
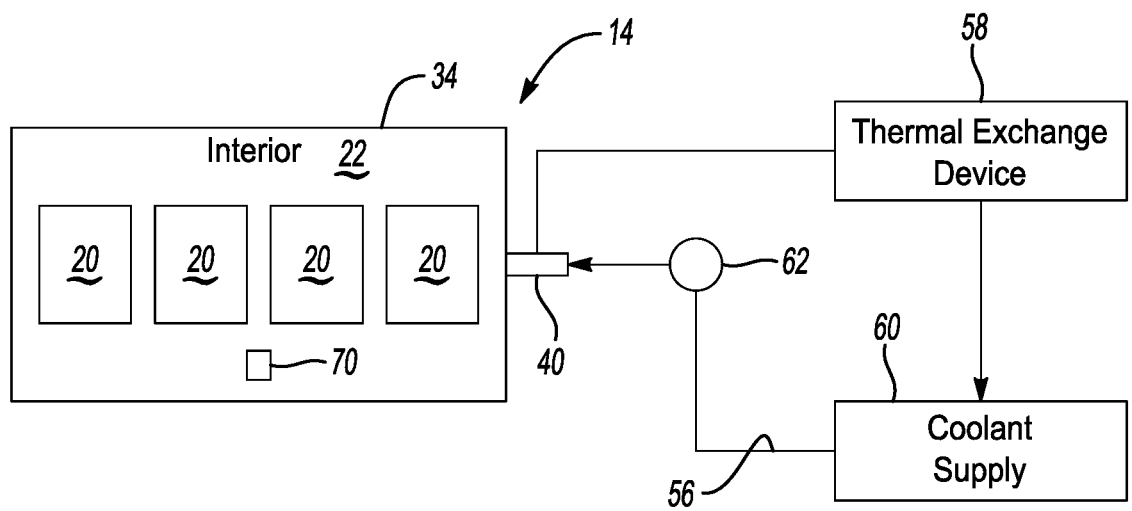
FIG. 4 illustrates a schematic view of the battery pack of FIG. 2.
Figure 5:
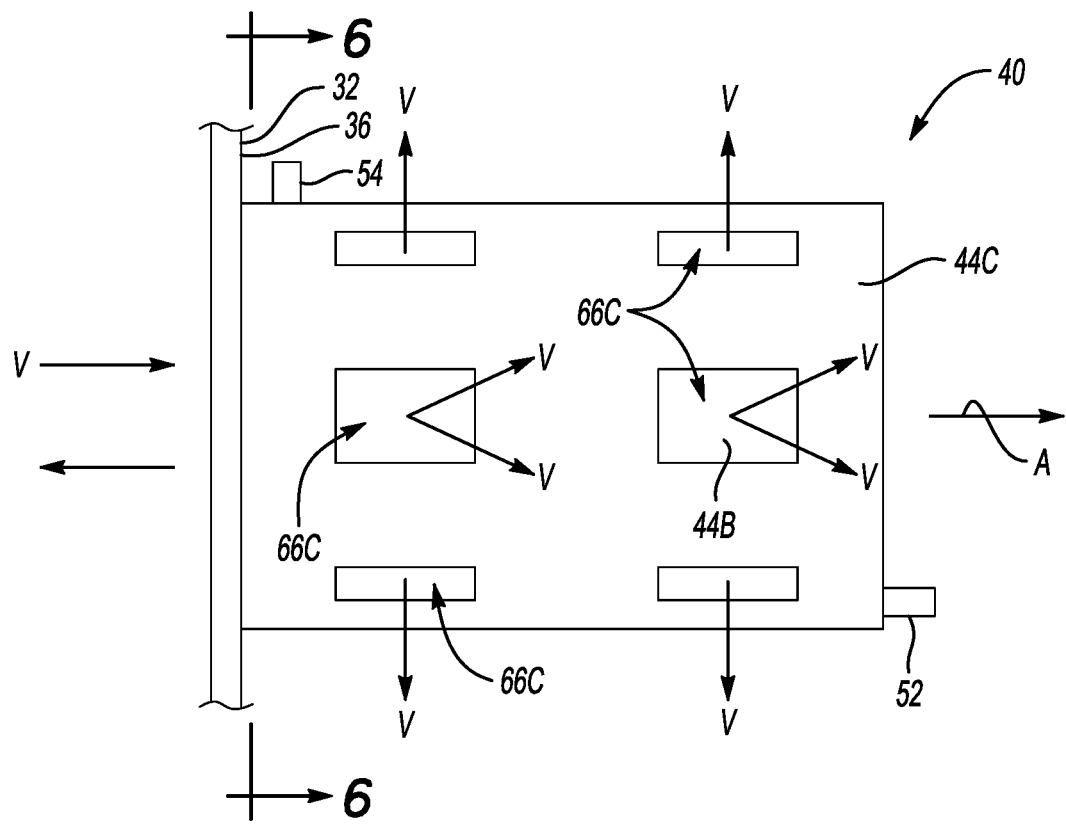
FIG. 5 illustrates a close-up side view of the battery pack vent of FIG. 3.
Figure 6:
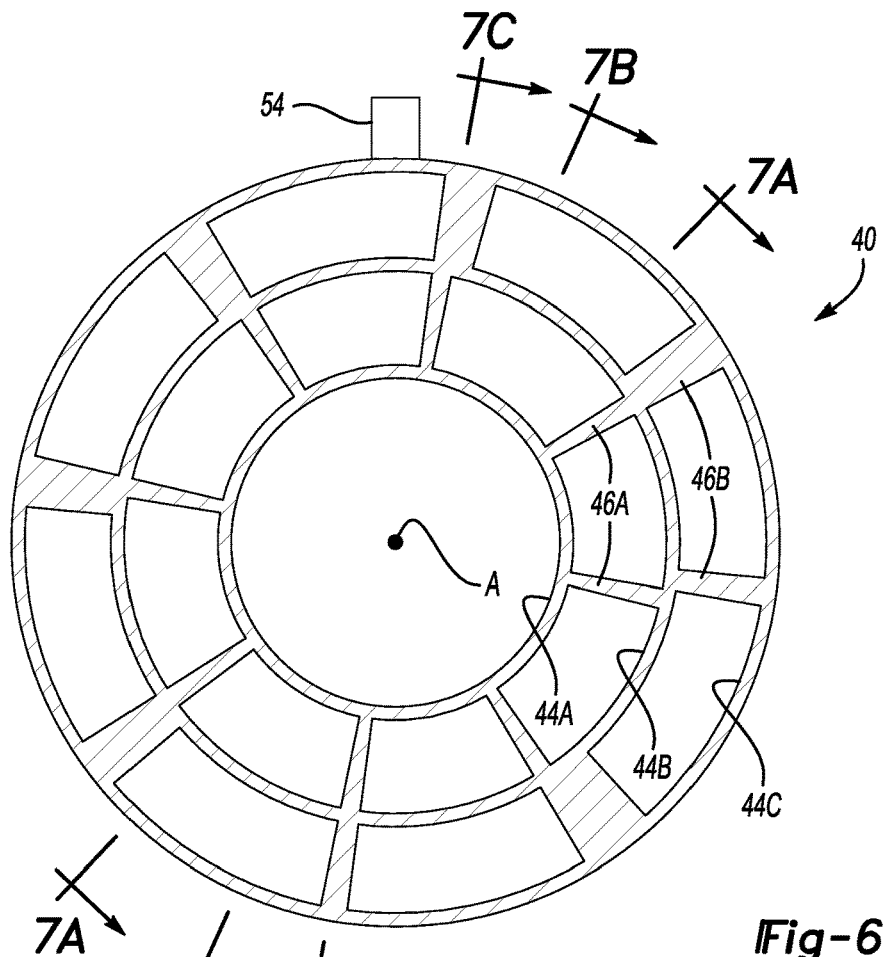
FIG. 6 illustrates a section view taken at line 6-6 in FIG. 4.

Referring now to FIGS. 4-6, the battery pack vent 40 includes, in this example, a first ring 44A, a second ring 44B, and a third ring 44C, which are arranged coaxially about a vent axis A. Support legs 46A extend from the first ring 44A to the second ring 44B, which is radially outside the first ring 44A. Support legs 46B extend radially from the second ring 44B to the third ring 44C, which is radially outside the second ring 44B.

In other examples, the vent 40 could include more than three rings or less than three rings. The vent 40 can be a metal or metal alloy material.

Figure 7A:
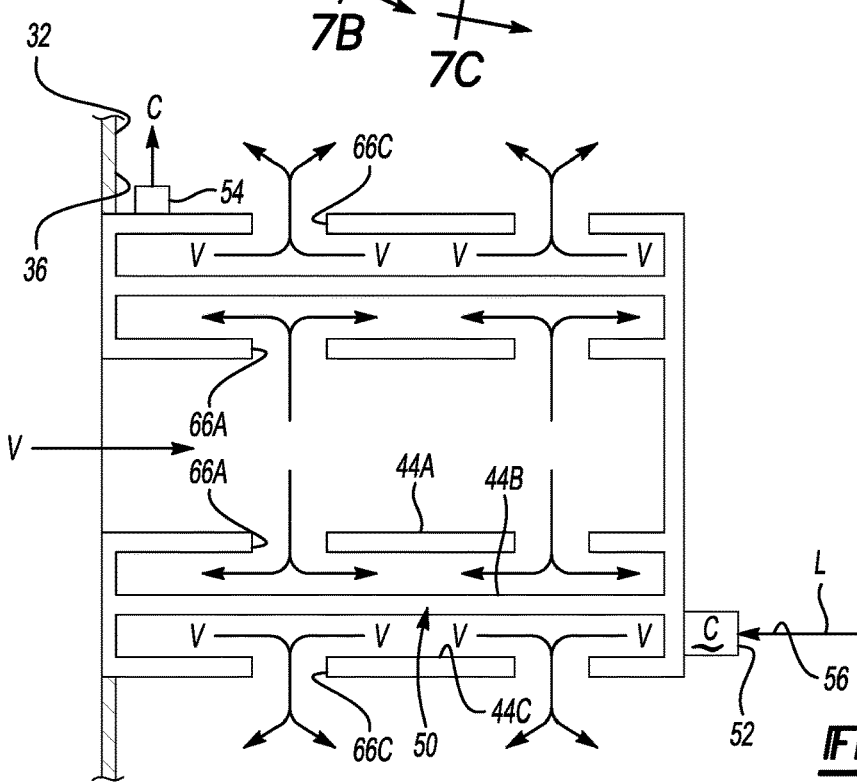
FIGS. 7A-7C illustrate section views taken at lines 7A-7A, 7B-7B, and 7C-7C in FIG. 6.
Figure 7B:
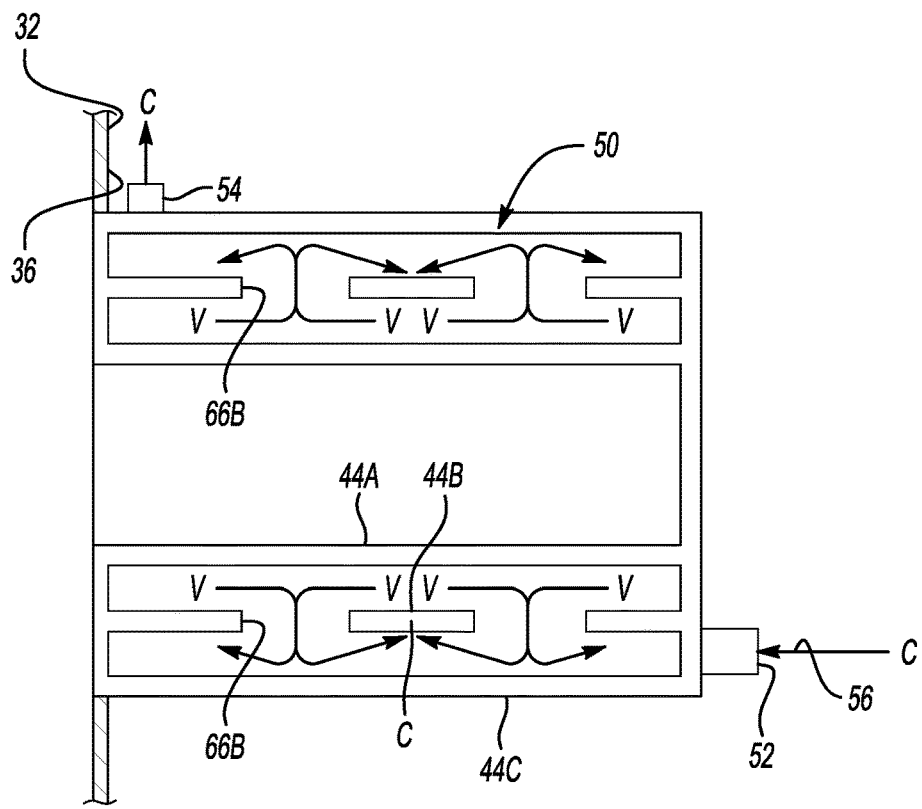
Figure 7C:
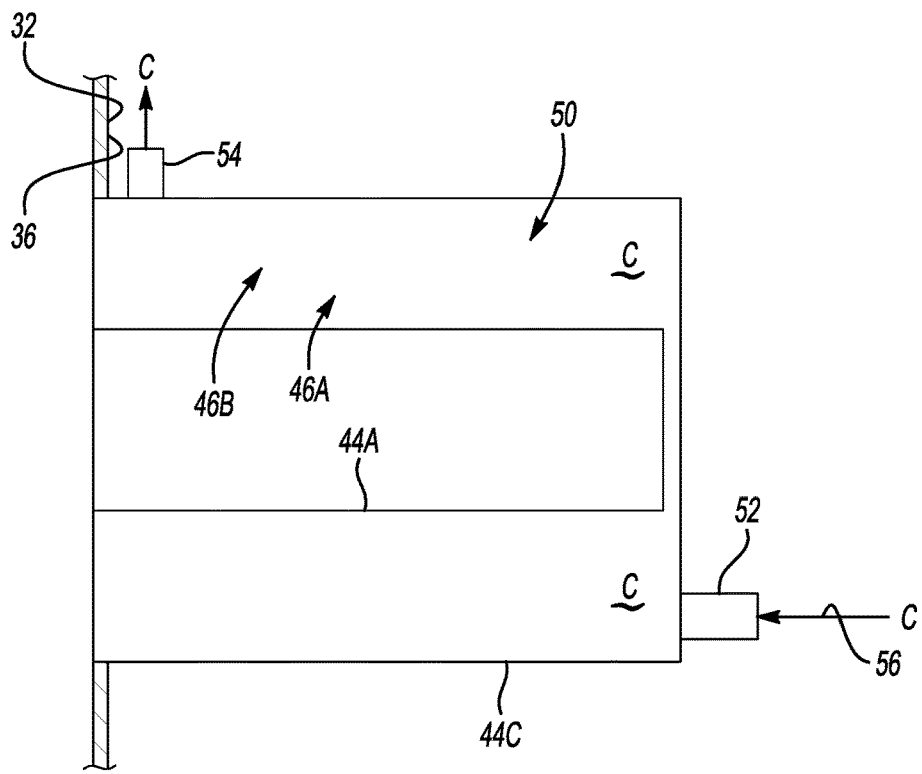
Figure 8A:
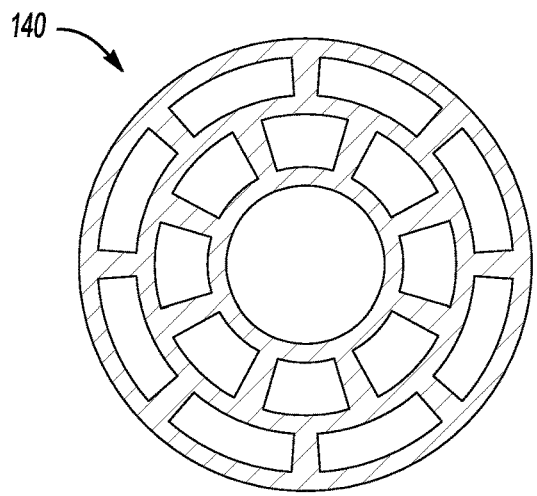
FIGS. 8A-8C illustrate section views through a vent according to another exemplary aspect of the present disclosure.
Figure 8B:
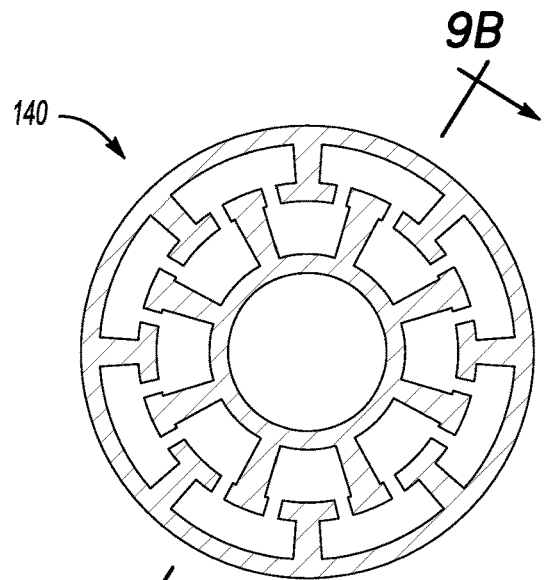
Figure 8C:
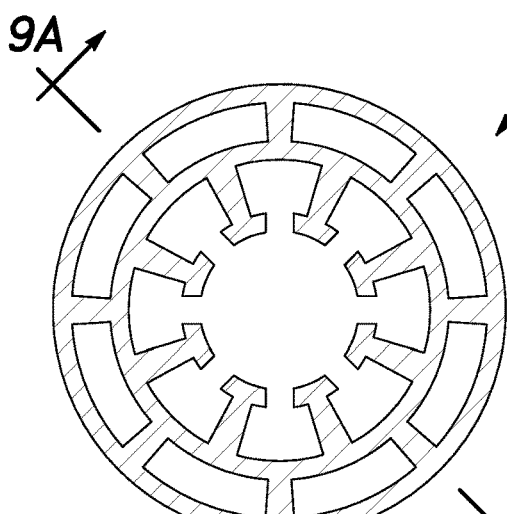
Figure 8D:
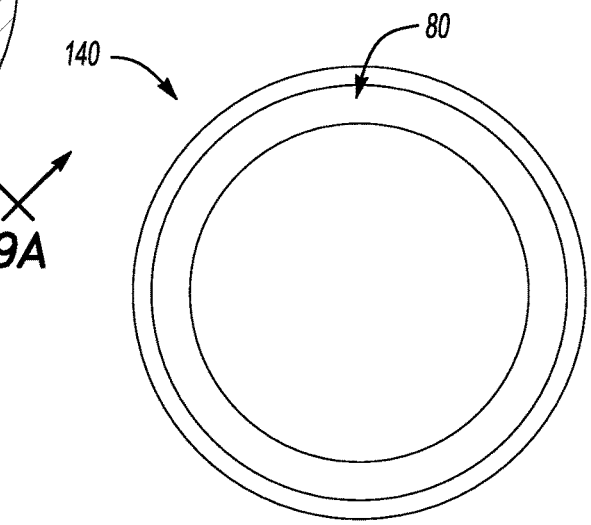
FIG. 8D illustrates an end view of the vent of FIGS. 8A-8C.
Figure 9A:
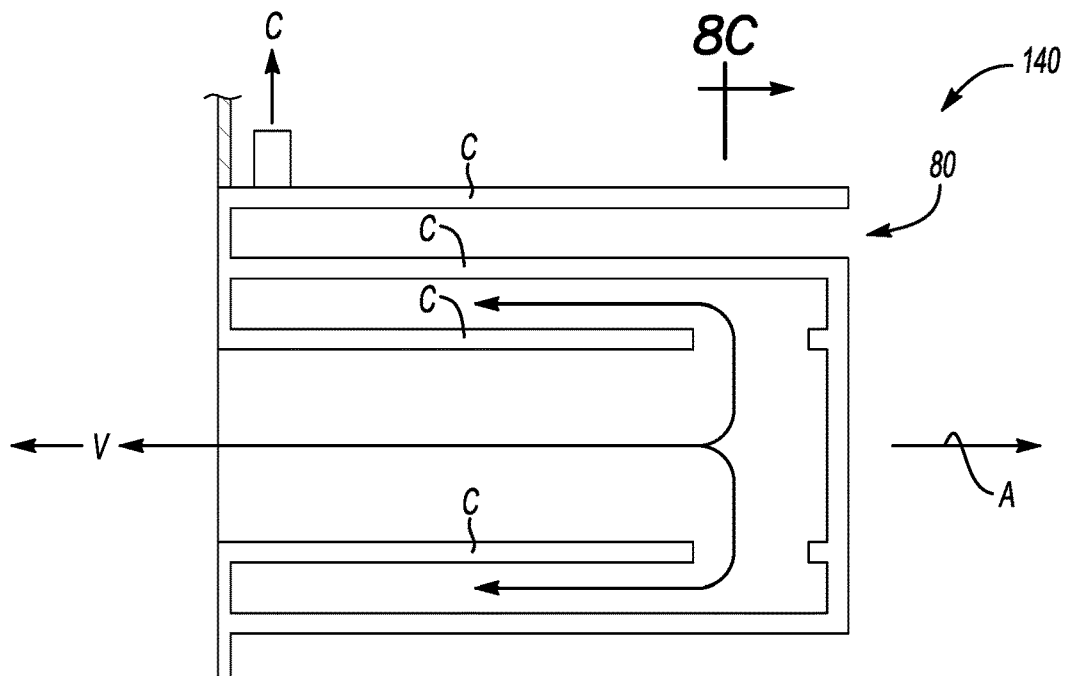
FIGS. 9A and 9B illustrates other section views through the vent of FIGS. 8A-8D.
Figure 9B:
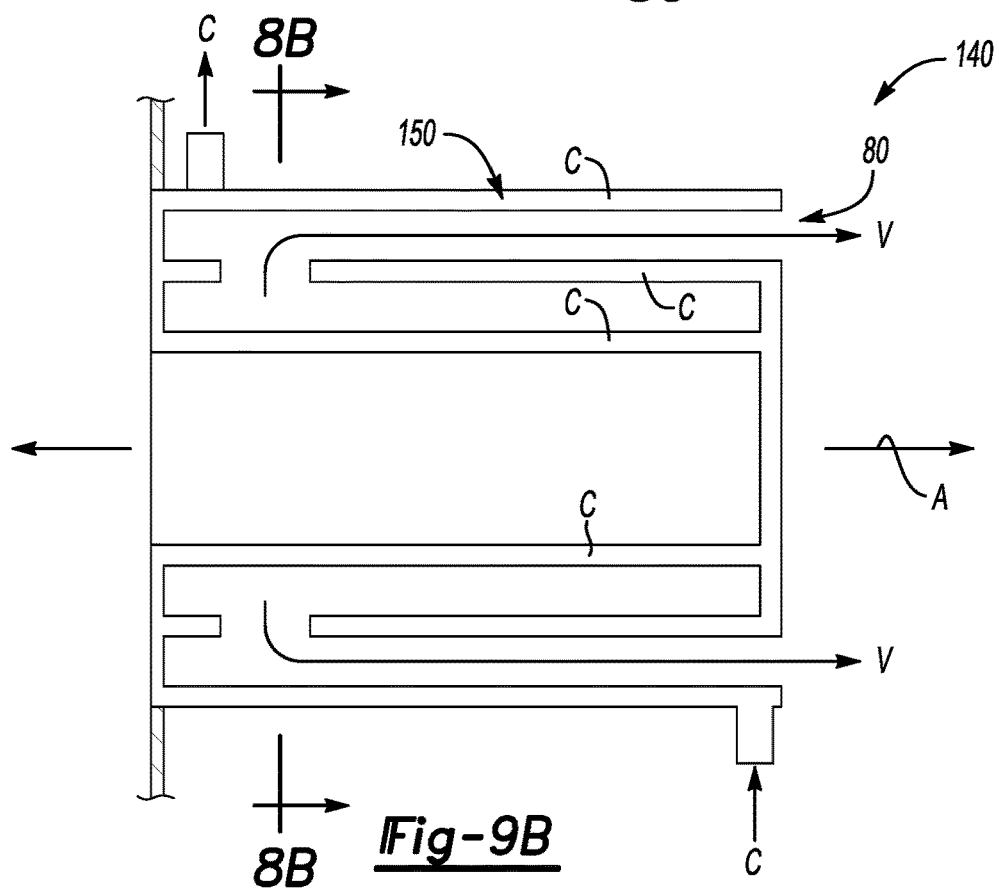

Referring now to FIGS. 7A-7C with continuing reference to FIGS. 2-5, to manage thermal energy of the vent byproducts V, the vent 40 includes a coolant passage 50 extending from a coolant inlet 52 to a coolant outlet 54. The coolant passage 50 extends, in this example, through the first ring 44A, the second ring 44B, and the third ring 44C. The coolant passage 50 additionally extends through the support legs 46A and the support legs 46B. The coolant passage 50 can be from two to five millimeters in diameter. In other examples, the coolant passage 50 can be less than two millimeters in some examples.

A coolant C, such as a liquid coolant, can move along a coolant path 56 into the coolant passage 50 through the inlet 52. The coolant C can exit the vent 40 through the outlet 54. From the outlet 54, the coolant C can move to a thermal exchange device 58, such as a heat exchanger, and then to a coolant supply 60. A pump 62 can draw coolant C which has been cooled at the thermal exchange device 58, from the coolant supply 60 and circulate the coolant C back through the inlet 52 into the battery cell vent 40.

During a thermal event, the vent byproducts V can move from the interior 22 into the vent 40. In particular, the vent byproducts V flow into the first ring 44A of the vent 40 in a first axial direction. The vent byproducts V then move radially outward from the axis A through a plurality of first ring apertures 66A within the first ring 44A. The first ring apertures 66A permit vent byproducts to flow radially from a position that is radially inside the first ring 44A to a position that is radially outside the first ring 44A.

After moving through the first ring aperture 66A, the vent byproducts V are radially between the first ring 44A and the second ring 44B. Notably, when the vent byproducts V are directed through the first ring aperture 66A the vent byproducts V impinge against a radially inner surface of the second ring 44B (FIG. 7A). The impingement can facilitate cooling the vent byproducts with the coolant C circulating through the coolant passage 50.

After impinging against the second ring 44B, at least some of the vent byproducts V turn and flow in an opposite, second axial direction. The vent byproducts V also flow circumferentially about the axis A between the first ring 44A and the second ring 44B and then move through second ring apertures 66B, which are circumferentially offset about the axis A relative to the first ring apertures 66A.

The second ring apertures 66B permit vent byproducts V to flow radially from a position that is radially inside the second ring 44B to a position that is radially outside the second ring 44B.

After the vent byproducts V pass through the second ring apertures 66B, the vent byproducts V impinge upon the inner surface of the third ring 44C (FIG. 7B). The impingement of the vent byproducts V against the inner surface of the third ring 44C can facilitate cooling of the vent byproducts V with coolant C moving through the coolant passage 50 within the third ring 44C.

The vent byproducts V then flow circumferentially until exiting the vent 40 through a plurality of third ring apertures 66C within the third ring 44C (FIG. 7A).

As the vent byproducts V pass through the vent 40, the coolant C within the coolant passage 50 cools the vent byproducts to lower a thermal energy level within the vent byproducts V. In some examples, a temperature of the vent byproducts V can be reduced by more than 300 degrees Celsius before the vent byproducts move through the third ring apertures 66C out of the vent 40.

While the pump 62 could continuously circulate coolant C though the coolant passage 50, the example pump 62 circulates coolant C only when one or more battery cells 26 are venting. The pump 62 could be activated to circulate coolant C through the coolant passage 50 of the vent 28 in response to a temperature within the interior 22 of the battery pack 12. For example, if a temperature sensor 70 within the interior 22 detects that a temperature has increased to say, greater than 200 degrees Celsius, a controller can activate the pump 62 to move coolant C through the vent 40. In such an example, a temperature of more than 200 degrees Celsius indicates that there is a high likelihood that at least one of the battery cells 26 is venting and expelling vent byproducts V into the interior 22.

While the example vent 40 expels the vent byproducts V radially relative to the axis A, other example vents can instead or additionally expel vent byproducts in other directions. For example, with reference to FIGS. 8A-9D, another example vent 140 can expel vent byproducts V through an annular outlet 80. The vent byproducts V exit the vent 140 after being cooled by a coolant moving through a coolant passage 150.

In the vent 40 and the vent 140, the support legs are circumferentially aligned. In other examples, support legs between a first innermost ring and a second intermediate ring could be circumferentially offset from support legs between the second intermediate ring and a third outer ring.

Features of the disclosed exemplary vents include the ability to rapidly cool vent byproducts prior to discharging the vent byproducts.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack venting assembly, comprising:
a battery pack vent that communicates a flow of vent byproducts from a battery pack, the battery pack vent having a coolant passage that communicates a coolant to manage thermal energy levels within the flow of vent byproducts, wherein the battery pack vent includes a first ring and a second ring arranged about a vent axis, the second ring radially outside the first ring, the battery pack vent further including at least one support leg extending radially from the first ring to the second ring.

2. The battery pack venting assembly of claim 1, wherein the coolant passage extends through the first ring, the second ring, and the at least one support leg.

3. The battery pack venting assembly of claim 2, wherein the battery pack vent further includes a third ring that is radially outside the second ring, the battery pack vent further including at least one support leg extending radially from the second ring to the third ring, the coolant passage additionally extending through the third ring and the at least one support leg extending radially from the second ring to the third ring.

4. The battery pack venting assembly of claim 2, wherein the first ring and the second ring are each annular structures that extend circumferentially continuously about the vent axis.

5. The battery pack venting assembly of claim 1, wherein the first ring includes a plurality of first ring apertures that permit vent byproducts to flow radially from a position that is radially inside the first ring to a position that is radially outside the first ring.

6. The battery pack venting assembly of claim 5, wherein the second ring includes a plurality of second ring apertures that permit vent byproducts to flow radially from a position that is radially inside the second ring to a position that is radially outside the second ring.

7. The battery pack venting assembly of claim 6, wherein the plurality of first ring apertures are circumferentially offset from the plurality of second ring apertures about an axis of the battery pack vent.

8. The battery pack venting assembly of claim 1, wherein the coolant is liquid coolant.

9. The battery pack venting assembly of claim 1, wherein the battery pack vent is a metal or a metal alloy.

10. The battery pack venting assembly of claim 1, wherein the battery pack vent is secured to an enclosure of the battery pack.

11. The battery pack venting assembly of claim 1, wherein the flow of vent byproducts is discharged radially from the battery pack vent.

12. A method of venting from a battery pack, comprising:
receiving a flow of vent byproducts within a ring of a battery pack vent, the ring disposed about a vent axis;
managing thermal energy within the flow of vent byproducts using a coolant that is communicated through the battery pack vent; and
discharging the flow of vent byproducts radially from the battery pack vent.

13. The method of claim 12, wherein the ring is a first ring, and further comprising communicating the vent byproducts within the battery pack vent between a first ring and a second ring of the battery pack vent.

14. The method of claim 13, wherein the coolant is communicated through at least one coolant passage within the first ring, within the second ring, or both.

15. The method of claim 13, further comprising, within the battery pack vent, directing the flow of vent byproducts radially through at least one first ring aperture in the first ring such that the flow of vent byproducts impinges on the second ring and then flows between the first ring and the second ring.

16. The method of claim 15, further comprising directing the flow of vent byproducts radially through at least one second ring aperture in the second ring.

17. The method of claim 12, wherein the coolant is a liquid coolant.

18. The method of claim 12, further comprising discharging the vent byproducts axially from the battery pack vent through an annular outlet.

19. A method of venting from a battery pack, comprising:
receiving a flow of vent byproducts at a battery pack vent;
managing thermal energy within the flow of vent byproducts using a coolant that is communicated through the battery pack vent; and
discharging the flow of vent byproducts from the battery pack vent communicating the vent byproducts within the battery pack vent between a first ring and a second ring of the battery pack vent, wherein the first ring and the second ring are coaxially arranged about a vent axis.

20. The method of claim 19, wherein the first ring and the second ring are each annular structures that extend circumferentially continuously about the vent axis.

* * * * *